United States Patent [19]

Acosta

[11] 4,237,011
[45] Dec. 2, 1980

[54] QUICK CHANGE CARTRIDGE FILTER

[76] Inventor: William A. Acosta, 4101 Laurel Dr., Lafayette Hill, Pa. 19444

[21] Appl. No.: 767,251

[22] Filed: Feb. 10, 1977

[51] Int. Cl.³ ..................... B01D 27/00; B01D 35/00
[52] U.S. Cl. ............................. 210/237; 210/323 T; 210/328; 210/332; 210/440; 210/483; 210/323.2 248/500; 248/681; 294/94; 294/116
[58] Field of Search ........... 210/232, 237, 306, 323 T, 210/328, 332, 437, 440, 441, 442, 457, 458, 489, 483; 248/25, 154, 500, 117.4, 117.6, 117.7, 507; 294/86.3, 94, 96, 116; 269/91, 94, 239

[56] References Cited

U.S. PATENT DOCUMENTS

| | | | |
|---|---|---|---|
| 2,339,897 | 1/1944 | Wetzler | 269/94 |
| 2,408,586 | 10/1946 | Spievak | 269/94 |
| 2,476,734 | 7/1949 | Jellison | 294/116 |
| 2,537,594 | 1/1951 | Lehmann | 269/239 |
| 2,811,218 | 10/1957 | Winslow | 210/323 T |
| 2,815,052 | 12/1957 | Krasnow | 269/239 |
| 2,889,933 | 6/1959 | Brundage | 210/323 T |
| 2,981,416 | 4/1961 | Lawlor | 210/323 T |
| 3,164,406 | 1/1965 | Bary | 294/116 |
| 3,190,593 | 6/1965 | Kreger | 248/25 |
| 3,208,789 | 9/1965 | Barry | 294/116 |
| 3,279,608 | 10/1966 | Soriente | 210/232 |
| 3,319,793 | 5/1967 | Miller | 210/323 T |
| 3,337,216 | 8/1967 | Mayhew | 269/94 |
| 3,474,909 | 10/1969 | Kearns | 210/232 |
| 3,498,460 | 3/1970 | Lane | 210/232 |
| 3,598,242 | 8/1971 | Mott | 210/323 T |
| 3,615,016 | 10/1971 | Soriente | 210/232 |
| 3,712,606 | 1/1973 | Cole | 269/239 |
| 3,744,838 | 7/1973 | Jackson | 294/94 |
| 3,986,746 | 10/1976 | Chartier | 294/116 |
| 3,986,960 | 10/1976 | Wire | 210/323 T |
| 4,030,745 | 6/1977 | Schoeffler | 294/86.3 |

Primary Examiner—Ernest G. Therkorn
Attorney, Agent, or Firm—Caesar, Rivise, Bernstein & Cohen, Ltd.

[57] ABSTRACT

A filter system comprising a tank and a cage assembly releasably mounted therein. The cage assembly comprises a tube plate and a plurality of filter tubes projecting upwardly therefrom. A plurality of replaceable cartridges are telescoped over each of the tubes. Below the tubes is a plenum chamber for receiving filtered fluid. The entire cage assembly is removable from the filter tank by providing lifting trunnions on the cage assembly and by providing a yoke assembly for lifting the cage assembly out by the trunnions. The yoke assembly will automatically grasp the trunnions when it is inserted in the filter tank. A safety mechanism is provided for securing the yoke assembly on the trunnions.

When the cage assembly is lifted out of the filter tank, a mechanism is provided for automatically tilting the cage assembly to dump the filter cartridges from the cage assembly. The cage assembly is then secured on a pallet which can be moved to another location for reloading clean filter cartridges on the filter tubes. The yoke assembly is then used for the reinsertion of the cage assembly in the filter tank.

35 Claims, 16 Drawing Figures

QUICK CHANGE CARTRIDGE FILTER

SPECIFICATION

This invention relates to a novel filter system, and more particularly, to a filter system that includes a removable cage assembly mounted in a filter tank, a lifting mechanism for removing the cage assembly for replacing filter cartridges and a pallet for supporting and transporting the cage assembly during replacement of the filter cartridges.

Large filter systems which include replaceable cartridges are now in common use. These filter systems can be used for filtering all fluids, either liquid or solid, and have been found to be effective for the filtering purpose. These filter systems are commonly used in the filtration of fuel for aircraft in large installations, such as at commercial airports. When used in filtering aircraft fuel, great volumes of fuel are passed through the filter system, and the filter cartridges must be changed periodically, on the order of every ten days.

Until the present invention, the cartridges were changed by manually lifting them from the filter tubes while the filter tubes were permanently mounted within the filter tank. This presented an extremely difficult problem, in view of the size of the tank and the filter tubes. Thus, the tanks are extremely large, having a diameter on the order of forty-eight inches (122 cm.). Each filter tube has a height on the order of thirty-six inches (91.4 cm.), and has a number of replaceable cartridges thereon. It is thus seen that it is as extremely difficult process to remove the cartridges from all of the filter tubes, and this process can easily consume two days, during which time the filter is out of operation. Accordingly, utilizing the present filter systems wherein the cartridges must be changed every ten days, there are two days of down time for each ten days of use of the filter system.

A minor improvement was made over the process of changing the individual cartridges which consists of utilizing replaceable filter tubes which are preloaded with the filter cartridges. The problem with this technique, however, is the blind insertion of the new tubes into the tube plate. Thus, utilizing this technique, all of the filter tubes are removed, the cartridges are replaced and then the filter tubes are reinserted in the tank. The filter tubes having the cartridges thereon are quite heavy and manipulation is difficult. Even utilizing this technique, there is still a substantial amount of down time in changing the filter cartridges.

The filter system of this invention provides a cage assembly, which comprises the tube plate, the plenum chamber for the filtered fluid, the tubes and the cartridges in a single unit. The entire cage assembly is removed from the filter tank by a lifting system, which forms a part of this invention, and a new cage assembly, having clean cartridges thereon is inserted in the tank by the same lifting system. The entire down time for the filter system which is needed to remove the old cage assembly and insert the new one is only one-half hour.

This invention also includes a novel pallet which is used for storing and tramsporting the cage assemblies. Thus, when a cage assembly is removed from the filter tank, it is placed on the pallet and locked in place. The pallet can then be moved by a fork lift truck to another location, at which the filter cartridges can be changed. The cage assembly having the new filter cartridges thereon is stored on the pallet, and when it is necessary to place a new cage assembly in the filter tank, the pallet can be moved to a position adjacent the filter tank. When a cage assembly is removed from the filter tank it is placed on a pallet and the new cage assembly is removed from its pallet and placed into the filter tank.

It is accordingly an object of this invention to provide a novel filter system.

It is another object of this invention to provide a novel cage assembly for use in a filter system.

It is a further object of this invention to provide a novel lifting mechanism for removing a cage assembly from a filter system.

It is yet a further object of this invention to provide a novel pallet for supporting a cage assembly.

These and other objects of this invention are accomplished by providing a filter comprising a tank and a filter cage assembly mounted in said tank, said filter cage assembly comprising a plurality of removable filters, said filter cage assembly including a chamber for receiving filtered fluid, said chamber having an outlet therefrom, and means on said filter cage assembly for removing said assembly from said tank.

Figure 1:
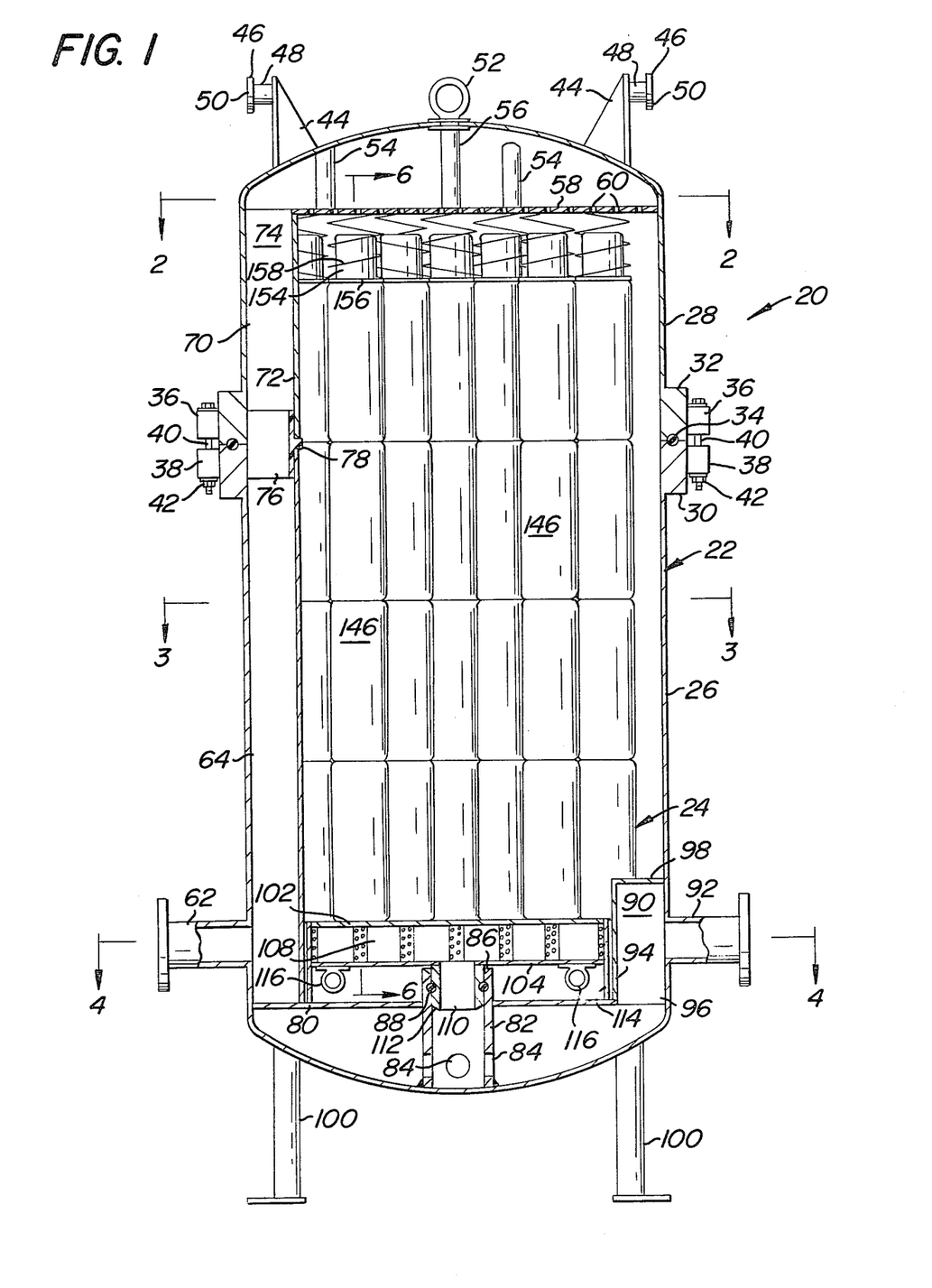
FIG. 1 is a sectional view of the tank and cage assembly of this invention.

Other objects and many of the attendant advantages of this invention will be readily appreciated as the same becomes better understood by reference to the following detailed description when considered in connection with the accompanying drawings wherein:

Referring now in greater detail to the various figures of the drawings wherein like reference characters refer to like parts, a filter system embodying the present invention is generally shown at 20 in FIG. 1. System 20 basically comprises a tank 22 and a filter cage assembly 24.

Tank 22 is basically cylindrical, and includes a lower portion 26 and an upper portion 28. An annular rim 30 is formed at the top of lower portion 26 and an annular rim 32 is formed at the bottom of upper portion 28. Each rim is provided with an annular groove, which is semi-circular in cross-section. In the assembled condition, the two grooves mate to form a circular groove, and an O-ring 34 is mounted in the two grooves. The O-ring provides a liquid-tight seal between the two portions. A plurality of cylinders 36 (FIGS. 1 and 2) project from rim 32 and a similar plurality of cylinders 38 (FIG. 1) project from rim 30. Cylinders 36 and 38 are alignable with each other and bolts 40 pass through the cylinders in the assembled condition of the tank. The bolts are secured in place by associated nuts 42 (FIG. 1).

Referring still to FIG. 1, it is seen that the upper portion or cover 28 of the tank has a pair of angle bars 44 secured thereon. A trunnion 46 is secured on each angle bar 44. Each trunnion comprises a horizontally extending leg 48 and an enlarged disc 50 projecting perpendicularly to leg 48 and integral therewith. A ring 52 is welded to the top of upper portion 28 at the center thereof.

Three equally spaced tubes 54 (FIGS. 1 and 3) are welded to the interior of the top of upper portion 28. Similarly, a tube 56 is welded to the upper portion of top 28 at the center thereof. Tubes 54 and 56 are also welded to the top of a plate 58. Plate 58 includes a plurality of holes 60 (FIGS. 1 and 2) passing therethrough.

Figures 2, 3, 4:
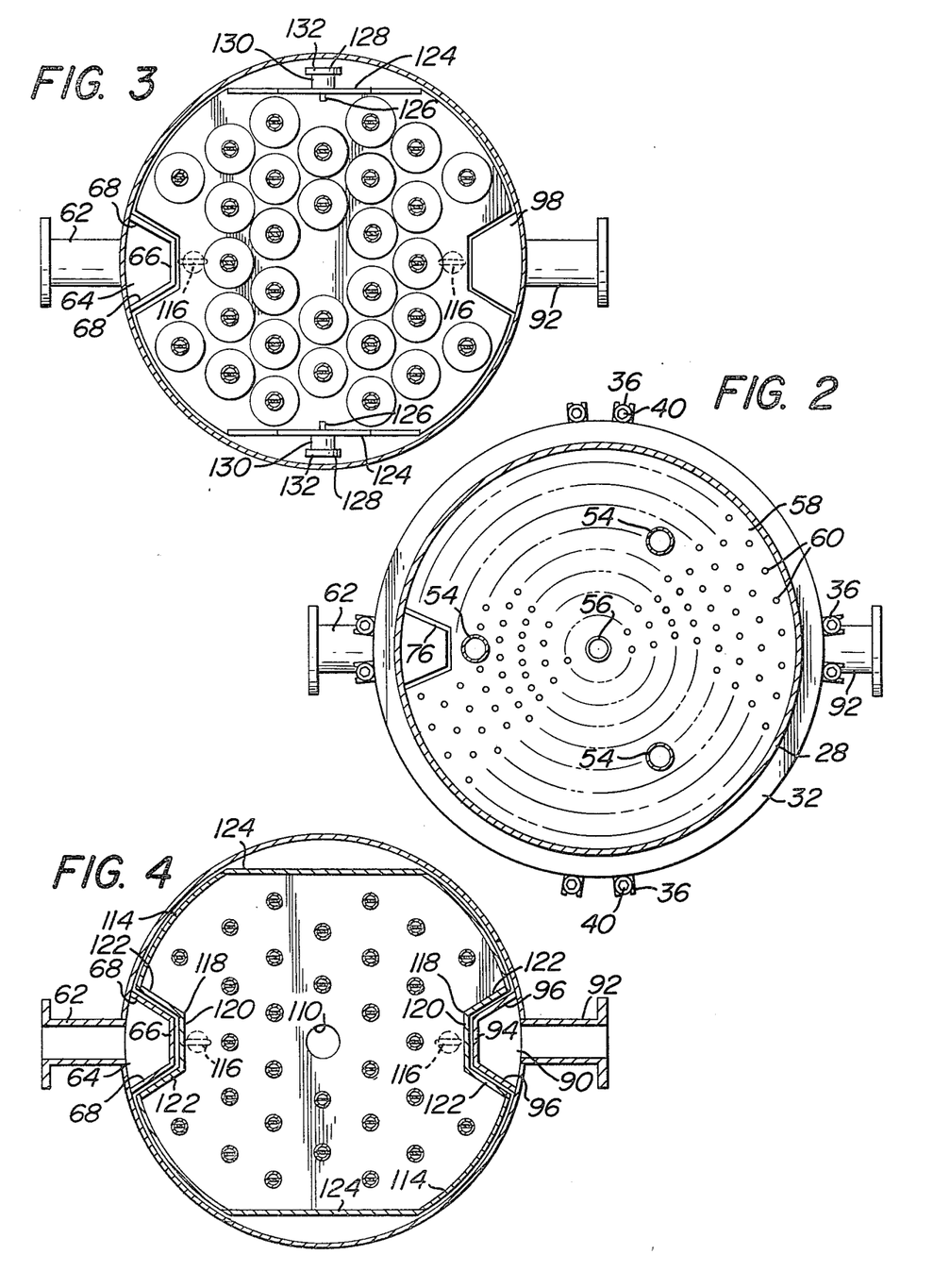
FIG. 2 is a sectional view taken along the line 2—2 of FIG. 1.
FIG. 3 is a sectional view taken along the line 3—3 of FIG. 1.
FIG. 4 is a sectional view taken along the line 4—4 of FIG. 1.

Bottom portion 26 of tank 22 has a pipe 62 welded thereon. Pipe 62 is the inlet pipe for fluid to be filtered. The incoming fluid passes into a channel 64 formed in lower portion 26. As seen in FIGS. 3 and 4, channel 64 is formed by an inner wall 66 and flared walls 68 which connect with the outer wall of lower portion 26.

Upper portion 28 of tank 22 also includes a channel 70. Channel 70 has the same configuration and dimensions as channel 64, and includes an inner wall 72 and flared walls 74 (one shown in FIG. 1) which connect the inner wall with the wall of tank portion 28. In the assembled condition of tank 22, channels 64 and 74 provide a continuous, fluid-tight channel for incoming fluid. In order to insure there is no leakage into the interior of the tank 22 from the continuous channel, a gasket 76 having an inwardly projecting lip 78 is positioned between the lower portion 26 and the upper portion 28.

Lower portion 26 is provided with a bottom plate 80. A pipe 82 passes through plate 80 and is welded to the bottom of lower portion 26. Pipe 82 is provided with a plurality of openings 84. The top of pipe 82 is beveled inwardly, as shown at 86. Pipe 82 is provided with an annular groove on its inner surface adjacent the top thereof, and an O-ring 88 is positioned in the groove.

An opening is formed in plate 80 at one side thereof, and a channel 90 places the chamber below plate 80 in fluid communication with an outlet pipe 92. Channel 90 is formed by an inner wall 94, flared side walls 96 and a top plate 98 (See FIGS. 1, 3 and 4). Tank 22 is supported in any conventional manner, as by legs 100.

Figure 5:
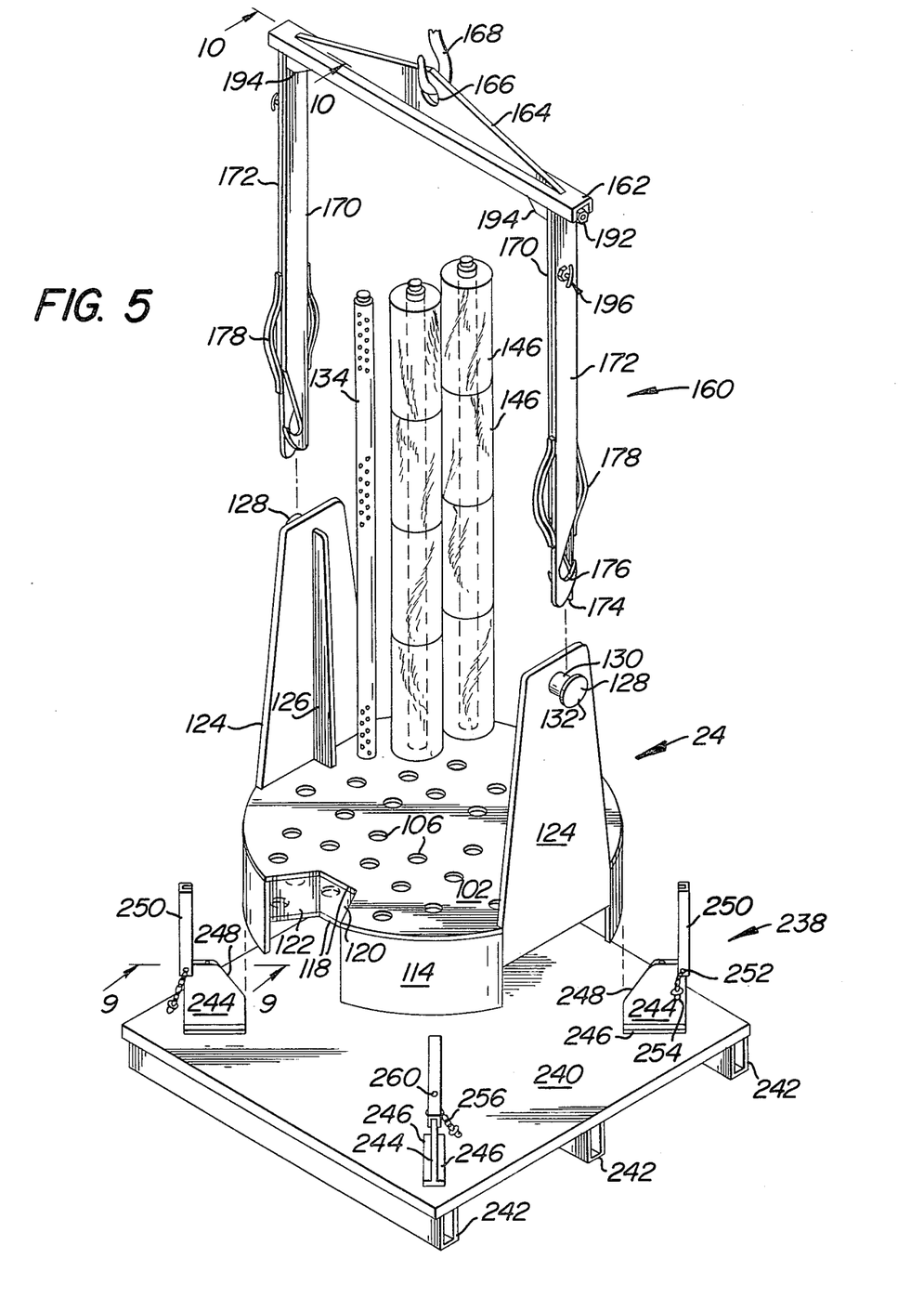
FIG. 5 is an exploded view of the lifting mechanism, filter cage and pallet of this invention.

Referring to FIGS. 1 and 5, it is seen that the filter cage assembly 24 includes a tube sheet 102 and a spaced plate 104 adjacent the bottom thereof. Tube sheet 102 includes a plurality of openings 106 passing therethrough. The area between sheet 102 and plate 104 forms a plenum chamber 108 for filtered fluid. An outlet nipple 110 (FIG. 1) is mounted in the center of plate 104, and is in fluid communication with plenum chamber 108. The lower edge of nipple 110 is beveled, as shown at 112. Nipple 110 includes an annular groove in the exterior surface thereof, which groove is adapted to receive O-ring 88, as seen in FIG. 1. The plenum chamber 108 is partially sealed at its sides by arcuate legs 114 (FIGS. 1 and 5). A pair of spaced rings 116 (FIG. 1) are secured on the bottom surface of plate 104.

As seen in FIGS. 4 and 5, a pair of diametrically opposed notches 118 are formed in tube sheet 102 and plate 104. The plenum chamber 108 is sealed at the notches by inner walls 120 and flared walls 122. The remainder of the seal for the plenum chamber 108 is formed by diametrically opposed upstanding legs 124 (FIGS. 4 and 5). Reinforcing ribs 126 are secured to legs 124 and project upwardly from sheet 102. A trunnion 128 (FIGS. 3 and 5) is secured on the exterior surface of each leg 124. Each trunnion comprises a leg 130 and an enlarged disc 132 projecting perpendicularly therefrom and integral therewith.

Figure 6:
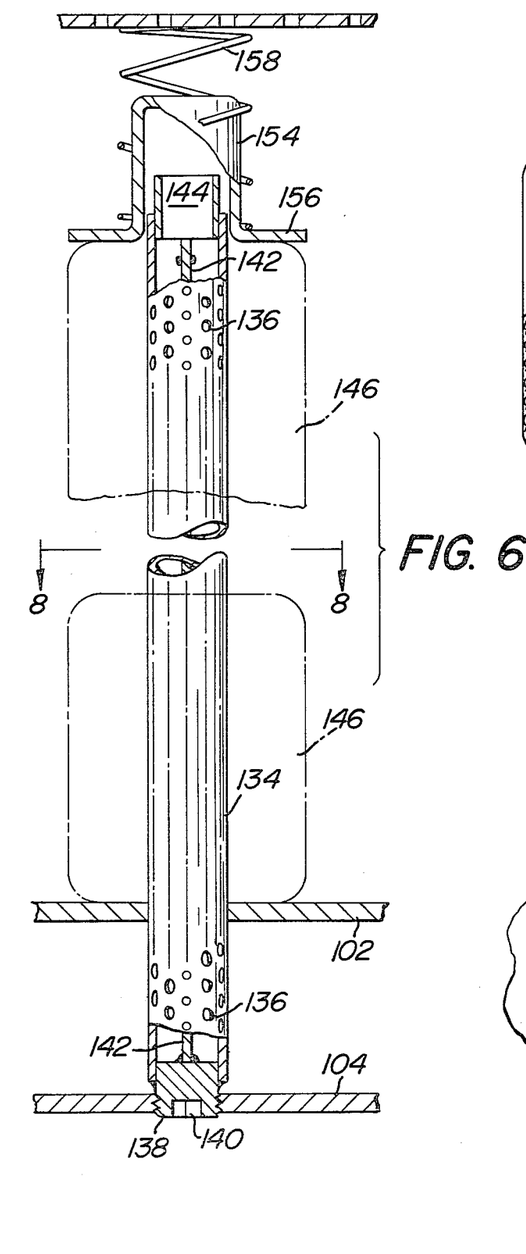
FIG. 6 is a sectional view, partially broken away, of one column of the filter system of this invention.

A filter tube 134 (FIG. 5) passes through each opening 106 in tube sheet 102, and has its lower end secured in plate 104. Referring to FIG. 6, it is seen that each filter tube is cylindrical, and has a plurality of openings 136 formed therein. Each filter tube serves the functions of supporting the filter cartridges and acting as a standpipe to convey filtered fluid, as explained hereinafter. A plug 138 is welded to the bottom of each tube 134, which plug has an external pipe thread to provide a fluid-tight seal. The tube passes through the opening 106 in sheet 102 and is threadedly secured in plate 104 by the plug 138. The plug 138 has a bottom opening 140 formed of a plurality of flat faces. The flat faces enable the plug to receive a wrench for threadedly rotating the plug, and the associated tube 134, into plate 104, in order to form a fluid-tight connection.

Figure 8:
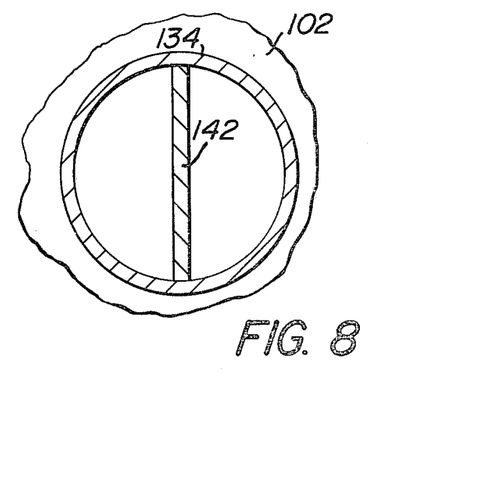
FIG. 8 is an enlarged sectional view taken along the line 8—8 of FIG. 6.

A reinforcing bar 142 is positioned within each tube 134, and extends for substantially the entire height thereof. As seen in FIG. 8, reinforcing bar 142 has a width which is substantially equal to the inside diameter of tube 134. The reinforcing bar 142 is secured to the tube 134 in any convenient mannner such as welding. By way of example, the bar 142 can be welded to plug 138 and welded to the interior of tube 134 adjacent the top thereof. A small tube 144 (FIG. 6) is secured in the top of tube 134, and abuts reinforcing bar 142.

Figure 7:
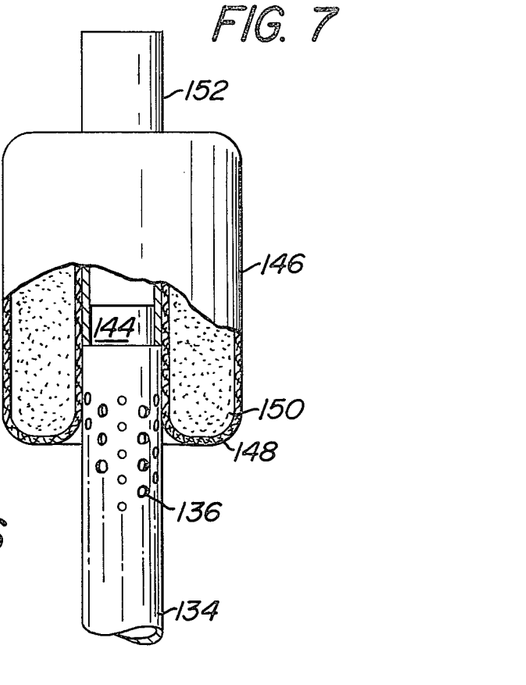
FIG. 7 is an elevational view, partially broken away and partially in section, showing the placing of a filter cartridge on a filter tube of this invention.

A plurality of disposable filter cartridges or elements 146 are telescoped over each filter tube 134. Elements 146 can be any of the disposable filter elements known to the art, such as paper, cellular or fabric filters. By way of example, elements 146 are fabric rings 148 filled with a filter medium 150, such as fuller's earth (FIG. 7). The fabric and fuller's earth filters are well known to the art. Because of the flexible nature of these filters, they are normally provided with a paper tubular core in order to aid in retaining structural integrity until they are used. The tube 144 on filter tube 134 serves the dual function of providing a guide for placing the filters 146 on the tube 134 and aiding in removing the paper core. Thus, as seen in FIG. 7, when the filter element 146 is placed on filter tube 134, the small tube 144 will project into paper core 152. The lower edge of the paper core will abut the top of tube 134. As the filter element 146 is pushed downwardly on tube 134, the paper core 152 will remain stationary, since it abuts the upper edge of tube 134. Continued downward movement of the filter element 140 will completely remove the paper core 152, and it can be discarded. At the same time, the filter element 146 can be slid downwardly on tube 134. In the embodiment of the invention shown, four filter cartridges or elements 146 are placed on tube 134. Obviously, the number of filter elements used will depend on the size of the filter system and the size of each cartridge.

Referring again to FIG. 1, the filter system shown therein is in condition for carrying out filtration. In assembling the device of FIG. 1 for filtration, filter cartridges 146 are placed on all of the filter tubes 134. Initially, the cover or top portion 28 of the filter tank is removed. With the cage assembly 24 in the condition shown in FIG. 1, the filter system 20 is made ready for filtration. In order to accomplish this, a hollow cap 154 (FIGS. 1 and 6) is placed on the top of each filter tube 134. Each cap 154 includes an integral annular flange 156 at the bottom thereof. As seen in FIG. 6, flange 156 rests on the uppermost filter cartridge 146.

After the caps 154 have been placed on each of the filter tubes 134, a compression spring 158 is telescoped over each cap 154. With all of the compression springs 158 in place, the upper portion or cover 28 of the tank 22 is placed on the lower portion 26. In doing this, the O-ring 34 is inserted in the groove of rim 32 and the cylinders 36 of the upper portion are aligned with the cylinders 38 of the lower portion. Thereafter, all of the bolts 40 are inserted and secured in place by nuts 42. This brings the plate 58 into abutment with the tops of the compression springs 158, and places a pressure on them. The plate 58 is prevented from moving by its securement to tubes 54 and 56. At this point, the filter system will be in the condition shown in FIG. 1.

When it is desired to filter a fluid, such as aircraft fuel, the fluid is pumped into pipe 62. The fluid then passes upwardly through channels 64 and 70, which are aligned. The fluid then passes into the upper cavity of cover 28, where it is distributed by plate 58 and where it passes through openings 60 in plate 58. The fluid then passes downwardly into the tank 22, and completely surrounds the filter cartridges 146. The fluid then passes through the filter cartridges and through the openings 136 (FIG. 6) in filter tubes 134. In this connection, it should be noted that all fluid must pass through the filter cartridges in order to gain access to the openings 136. Thus, the springs 158 and flanges 156 on caps 154 place a positive pressure against the stacked filter cartridges 146. This prevents any leakage between adjacent filter cartridges or between the bottommost filter cartridge and tube sheet 102.

After the fluid has passed into openings 136, all contaminants will have been filtered out by the cartridges 146. The clean fluid then passes downwardly through the interior of tubes 134, where it exits through the lower holes 136, which are positioned within plenum chamber 108 (FIG. 1). The filtered fluid then exits from the plenum chamber 108 through nipple 110 and into pipe 82. The clean fluid then exits from pipe 82 through openings 84. Thereafter, the filter fluid passes up through channel 90 and through exit pipe 92, where it is ready for use or storage.

Periodically, the filter cartridges 146 will become sufficiently contaminated to prevent continued efficient filtration. At this point, the cartridges must be replaced. In order to replace the cartridges, the pumping of contaminated fluid is ceased. When the filter vessel 22 has been drained, bolts 40 are then removed. The cover or upper portion 28 is then lifted from the lower portion 26. The lifting can be accomplished by placing a hook suspended from a hoist in ring 52, and then utilizing the hoist to remove the cover. Preferably, however, the cover is removed by utilizing the lifting mechanism forming a part of this invention.

The lifting mechanism forming a part of this invention is generally shown at 160 in FIG. 5. It includes a U-shaped bar 162 having a plate 164 projecting upwardly therefrom. An opening 166 is formed in plate 164, for suspending the mechanism from a hook 168 (FIG. 5). Two pairs of bars 170 and 172 are suspended from bar 162.

Figure 13:
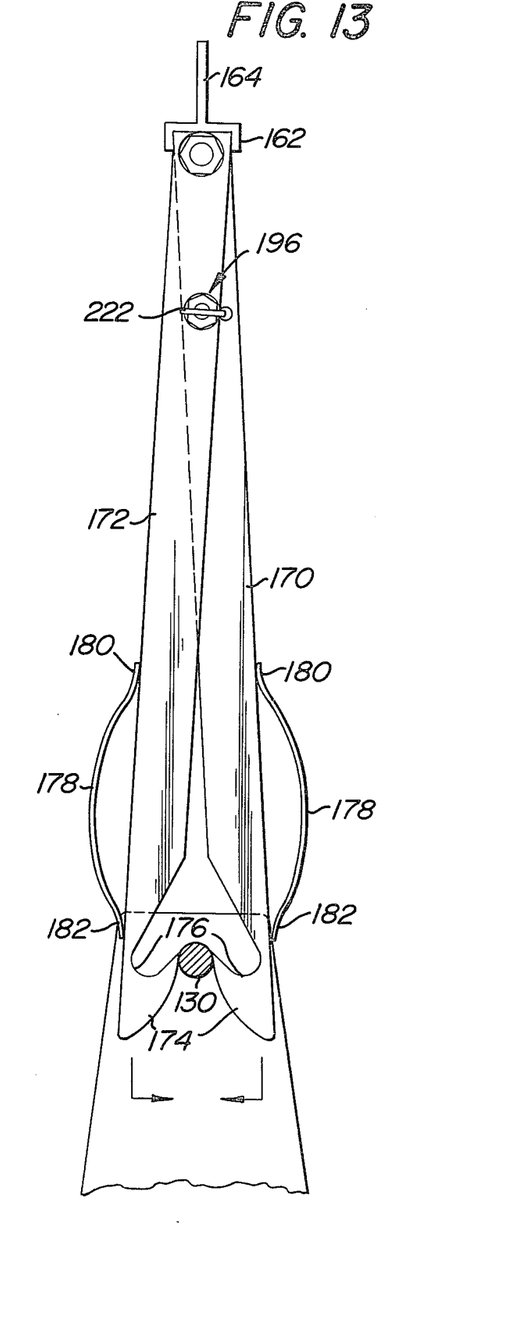
FIG. 13 is an elevational view, partly in section, showing the method of securing the lifting assembly on the filter cage.

As best seen in FIG. 13, each bar 170 and 172 includes an arcuate surface 174 at the bottom thereof. A notch 176 is formed in each bar interiorly of the arcuate surface 174. An arcuate leaf spring 178 is secured on the outer edge of each bar 170 and 172. The top 180 of each leaf spring is welded to its associated bar 170 and 172. The bottom 182 of each leaf spring is free to slide along the outer edge of its bar.

Figures 10, 11:
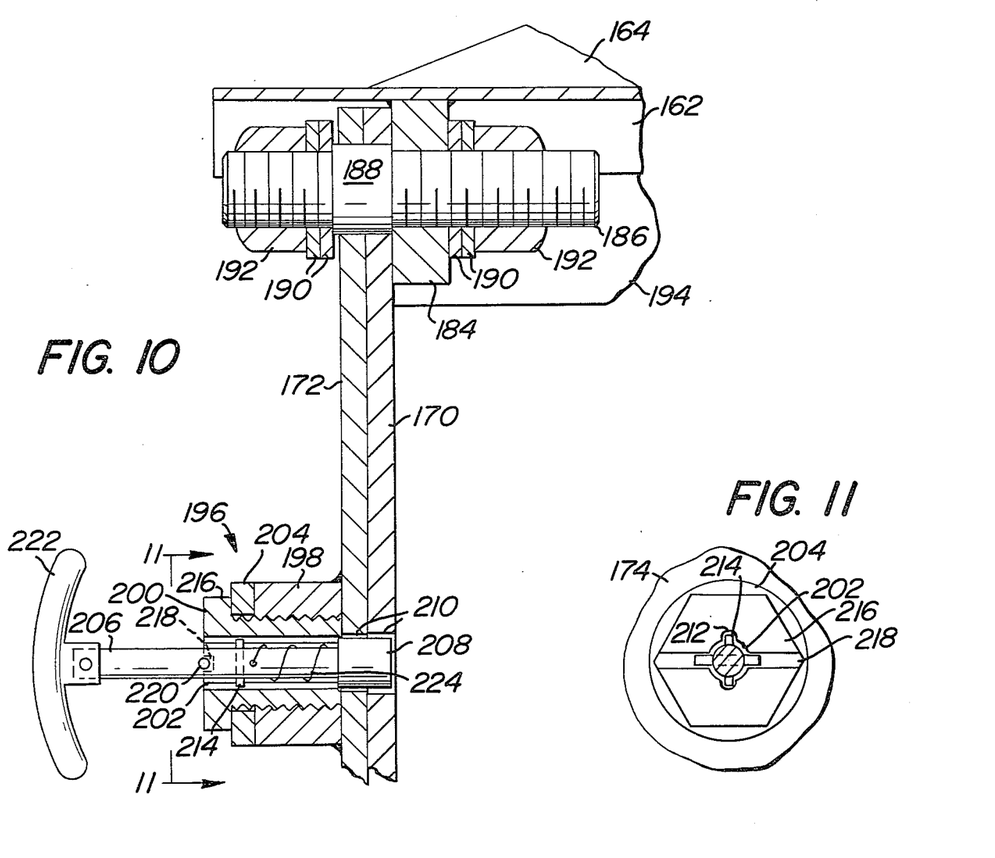
FIG. 10 is an enlarged sectional view taken along the line 10—10 of FIG. 5.
FIG. 11 is a sectional view taken along the line 11—11 of FIG. 10.

The mechanism for suspending the bars 170 and 172 from bar 162 is best seen in FIG. 10. As seen therein, a block 184 is welded to the undersurface of bar 162 for each pair of bars 170 and 172. Block 184 has a central opening through which a threaded shaft 186 passes. Shaft 186 includes a shoulder 188, with one edge of the shoulder abutting the side of block 184. Openings are provided in the tops of bars 170 and 172, and the bars are suspended from shoulder 188 by passing the shoulder through the openings. The bars are secured in place by washers 190 and associated nuts 192 which are threadedly secured on shaft 186. As seen in FIG. 10, bars 170 and 172 are free to rotate about shoulder 188, with the shoulder providing sufficient clearance between the washers 190 and the side of block 184. Gusset plates 194 (FIG. 5), which are welded to bar 162, cover the supporting mechanism for the bars 170 and 172.

A safety latching mechanism is provided for each pair of bars 170 and 172. The latching mechanism is generally shown at 196 in FIG. 10. As seen therein the mechanism includes a cylinder 198 which is welded to the side of the exterior bar 172 in each pair of bars. Cylinder 198 is internally threaded. A sleeve 200 having an internal bore 202 is threadedly secured in cylinder 198. An internally threaded lock washer 204 secures the sleeve 200 in place. A shaft 206 is positioned in bore 202. Shaft 206 includes a large cylindrical head 208, which is slightly smaller in diameter than the diameter of bore 202. Bars 170 and 172 include alignable openings 210 which are adapted to receive enlarged head 208.

As seen in FIG. 11, bore 202 is basically circular in cross-section. However, it has a vertically extending enlargement which provides a vertical channel 212. Shaft 206 includes a first pin 214 which, in one position of the shaft, is received in channel 212. Sleeve 200 includes an enlarged head 216, which abuts lock washer 204. Head 216 includes a horizontally extending slot 218 (FIG. 11) which is formed in the outer face thereof. Shaft 206 includes a second pin 220, which in one position of the shaft is received in slot 218.

Shaft 206 includes a handle 222 secured thereon. A tension spring 224 has one end secured in shaft 206 and the other end secured to sleeve 200 within bore 202. The tension spring urges shaft 206 to the position shown in FIG. 10.

The method of removing a cage assembly 24 containing contaminated filter cartridges 146 will now be described.

The cover 28 of the filter tank 22 is first removed, as described above. Thereafter, the handle 222 is pulled outwardly (to the left) as viewed in FIG. 10 against the urging of spring 224. This pulling movement removes pin 214 from bore 202 and associated channel 212. At the same time, the enlarged head 208 is removed from inner bar 170. When the shaft 206 has been pulled a sufficient distance to remove pin 214 from channel 218, that is, exteriorly of the head 216 of sleeve 200, the handle is rotated 90° in either direction. This will align pin 214 with slot 218 in head 216 (FIG. 11). Thereafter, handle 222 is released, and this will seat pin 214 in slot 218. The pin 220 will be removed from the slot at this point. At this time, the enlarged head 208 will no longer be positioned in the hole 210 of bar 170, but will be outward thereof. Accordingly, bars 170 and 172 are free to pivot relative to each other about shoulder 188.

The position of the handle 222 with the bars in a freely pivotable condition is shown in FIG. 13. With the bars in this condition, the lifting mechanism 160 is lowered into tank 22. At the time of lowering, each pair of bars 170 and 172 is vertically aligned with the trunnions 128 on the filter cage assembly 24 (FIG. 5). As the lifting mechanism 160 is lowered, the arcuate edges 174 of the legs 170 and 172 will come in contact with the legs 130 of the trunnions (FIG. 13). Continued lowering of the lifting mechanism will cause the legs 170 and 172 to spread, under the urging of the legs 130. Thus, the arcuate surfaces 174 act as camming surfaces to spread the legs. At the same time as the legs are spreading, the springs 178 on the legs are in contact with the interior wall of lower tank section 26. Accordingly, the walls of the tank are placing a spring pressure against the legs 170 and 172, urging the legs toward each other. In this connection, it should be recalled that the springs 178 are welded at their top edges 180 and are freely slidable along the legs 170 and 172 along their lower edges 182. Thus, the springs will tend to flatten against the legs or bars 170 and 172 during the downward movement thereof.

Figure 12:
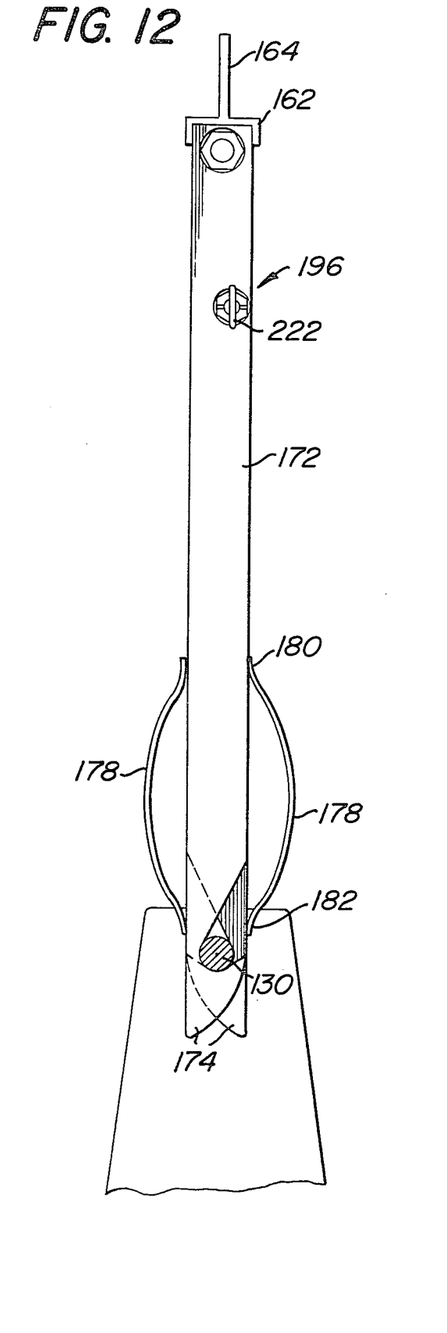
FIG. 12 is an elevational view, partly in section, showing the condition of the lifting assembly when removing the filter cage from the tank.

As soon as the arcuate edges 174 have passed legs 130 during the downward movement, the springs 178 will force the bars 170 and 172 toward each other. The bars 170 and 172 will then securely encircle the legs 130 within notches 176 (FIG. 12). When the bars 170 and 172 are forced together by the urging of the walls of the tank on springs 178, the bars are locked together.

The locking of the bars is accomplished through the use of latching mechanism 196. Thus, after the bars 170 and 172 have been snapped into the position shown in FIG. 12, the handle 222 is again grasped, pulled outwardly until pin 214 is removed from slot 218 and is then rotated 90° in a direction opposite to the previous rotation. This will again align pin 214 with channel 212. Handle 222 is then released, and spring 224 returns the shaft to the position shown in FIG. 10. At this point, the pin 214 is again within channel 212 and head 208 is in aligned openings 210 in bars 170 and 172. This prevents any further rotational movement of the bars 170 and 172 relative to each other. This will also securely lock the notches 176 around legs 130 of trunnions 128. The discs 132 of the trunnions prevent any lateral movement of the bars 170 and 172 on legs 130.

Figure 14:
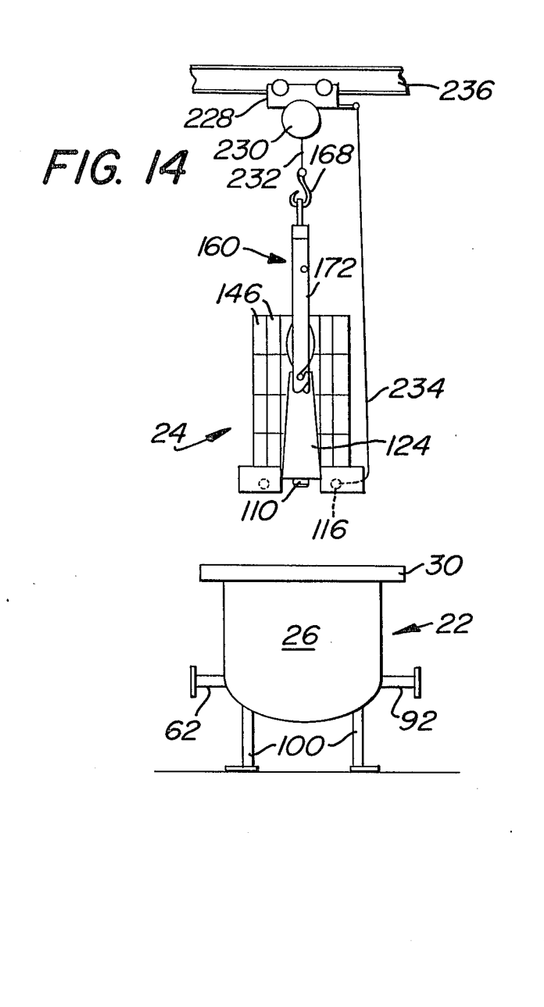
FIG. 14 is a schematic view showing the removal of the filter cage from the tank.

The lifting of the cage assembly 24 from lower portion 26 of tank 22 is schematically shown in FIG. 14. Any conventional lifting mechanism can be used. By way of example, the lifting mechanism can include a rail 226 having a trolley 228 mounted thereon. A motor driven hoist 230 is mounted on trolley 228. Hoist 230 includes a cable 232, to which hook 168 is secured.

When the hoist 230 is actuated, cable 232 will be wound on the drum of the hoist, thereby lifting cage assembly 24 from the lower portion 26 of tank 22. When the cage has been lifted totally out of the tank, a cable 234, which is suspended from trolley 228, is hooked to a ring 116 (FIG. 1) mounted on the bottom of the cage assembly.

Figure 15:
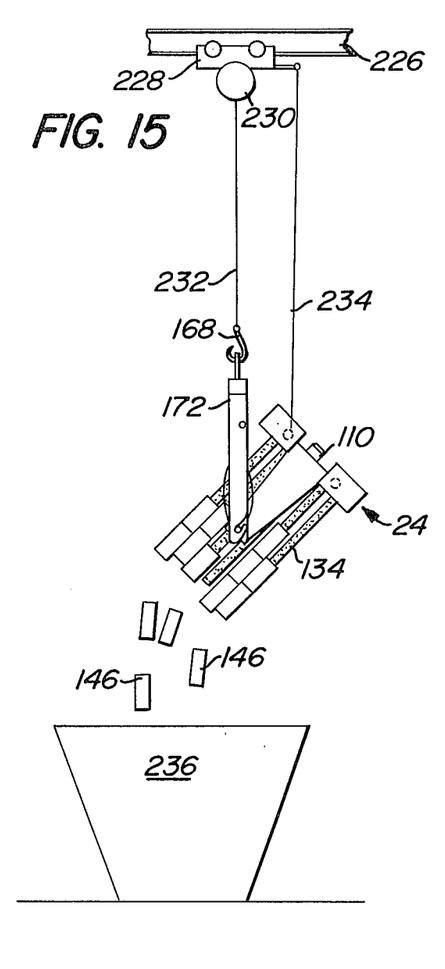
FIG. 15 is a schematic view showing the removal of the filter cartridges from the filter cage.

After the cage assembly is in the position shown in FIG. 14, trolley 228 is moved along rail 226 until the cage assembly 224 is positioned over a dump bin 236 (FIG. 15). The hoist 230 is again actuated, only this time the direction of rotation of the winding motor is reversed. This causes the cable 232 to move downwardly. As the cable 232 moves downwardly, the cage assembly 24 rotates about trunnions 128. thus, the length of cable 234 is fixed, and as cable 232 elongates, the ring 116 provides a pivot point for rotating the cage assembly. There is also free rotation of bars 170 and 172 about the trunnions. When the cable 232 has been elongated to the extent shown in FIG. 15, the filter cartridges 146 will freely slide off filter tubes 134 into bin 236. After all of the filter cartridges have been removed, the hoist 230 is again actuated, thereby winding cable 232 thereon. This returns the cage assembly to an upright position. However, the filter cartridges will have all been removed at this point.

Figure 16:
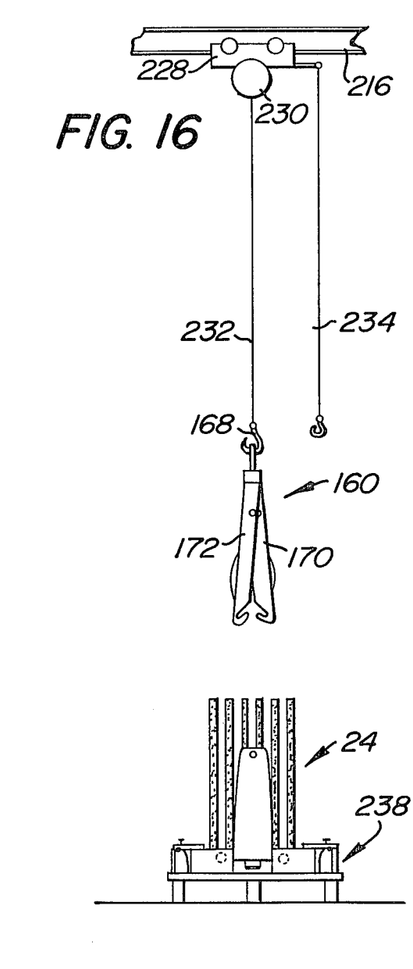
FIG. 16 is a schematic view showing the condition of the filter cage after it has been placed on the pallet.

After the cartridges 146 have all been dumped, the filter cage assembly 24 is then deposited on a pallet, which is schematically shown at 238 in FIG. 16. The pallet, the details of which will be described hereinafter, is then used for moving the cage assembly to a new location where it is refitted with clean, disposable cartridges 146 and stored for later use. When the cage assembly 24 has been placed on the pallet 238, the latching mechanism 196 is opened, and the bars 170 and 172 are lowered to a sufficient extent to have the legs 130 of trunnions 128 clear the notches 176 (FIG. 13). At this point, the legs or bars 170 and 172 can be pulled apart and the lifting mechanism 160 can then be raised to the position shown in FIG. 16.

The trolley 228 is then moved to a new position over a cage assembly 24 which is loaded with new filter cartridges 146. The lifting mechanism 160 is lowered until the trunnions 128 are engaged in notches 176, the bars 170 and 172 are pushed together and the latching mechanism 196 is engaged to maintain the bars in their closed position. Thereafter, hoist 230 is actuated, the cage assembly 24 is lifted and the trolley is moved to the position shown in FIG. 14. The cage assembly 24 is then lowered into the lower portion 26 of tank 22.

During the lowering process, the notches 118 (FIG. 5) of the cage assembly are aligned with the channels 64 and 90 (FIG. 4) of the tank 22. As the cage assembly is lowered in the tank, the walls of the channels will serve as a guide for locating the cage assembly within the tank. Continued lowering of the cage assembly will engage nipple 110 in pipe 82 (FIG. 1). The beveled edge 86 and 112 aid in the blind seating of the nipple in place. When the cage assembly is fully lowered within the tank, the O-ring 88 will be received in the annular groove of pipe 82.

After the cage assembly 24 has been lowered into place, the bars 170 and 172 are removed. This is accomplished by first releasing the latching mechanism 196 (FIG. 10). Thus, handle 222 is pulled outwardly to remove pin 214 from channel 212. The handle is then rotated 90° in order to seat pin 214 in slot 218. At this point, bars 170 and 172 are free to rotate relative to each other. The lifting mechanism, including the bars 170 and 172, is then lowered within the tank section 26. Continued lowering of the bars brings the legs 130 of trunnions 128 into contact with the inclined outer surfaces forming notches 176 (FIG. 13). This pushes the bars 170 and 172 apart, against the urging of springs 178. After the bars 170 and 172 have been moved a sufficient distance to clear enlarged head 208 on shaft 206 (FIG. 10), handle 222 is again grasped and pulled, the shaft 206 is rotated, and the pin 214 is returned to channel 212 (FIG. 11). At this point, the edge of bar 170 will abut the enlarged head 208 of shaft 206. This maintains the bars 172 and 170 in a spread position.

Thereafter, the lifting mechanism 160 is raised by hoist 230. With the bars 170 and 172 locked in the spread position, they will bypass legs 130 of trunnions 128 as they are lifted. This removes the bars 170 and 172 from the lower tank portion 26, while at the same time leaving the cage assembly 24 securely in place.

After the cage assembly has been lowered in place, the cover or upper portion 28 of the tank is replaced. This can be lowered in place by the engagement of the hook 168 on cable 232 in ring 52. Alternatively, the bars 170 and 172 can be engaged on trunnions 46 of the cover, and the cover can be lowered in place in the same manner as the cage assembly is lowered in place (FIG. 14). Once the cover 28 is in place, the bolts 40 are reinserted, the nuts 42 are tightened and the filter system 20 is again ready for use.

The pallet forming a part of this invention is generally shown at 238 in FIG. 5. The pallet comprises a plate 240 and spaced parallel supporting legs 242. The plate 240 is square, and at each of the corners of the plate there is secured a vertically extending plate 244 having supporting size flanges 246. The inner edge of each plate 244 is angled downwardly, as shown at 248. A U-shaped bar 250 is pivotally mounted on each plate 244 by a pin 252. The distance between the legs of the U-shaped bar 250 is slightly greater than the thickness of plate 244 so that when bar 250 is pivoted to a horizontal position about pin 252 (FIG. 9) the plate 244 will be positioned between the legs of the bar 250.

A bolt 254 (FIG. 9) is secured to each plate 244 by a chain 256. The chain 256 has one end secured to bolt 254 and the other end secured to pin 252. A thumb wheel 258 is mounted on the top of each bolt 254.

Figure 9:
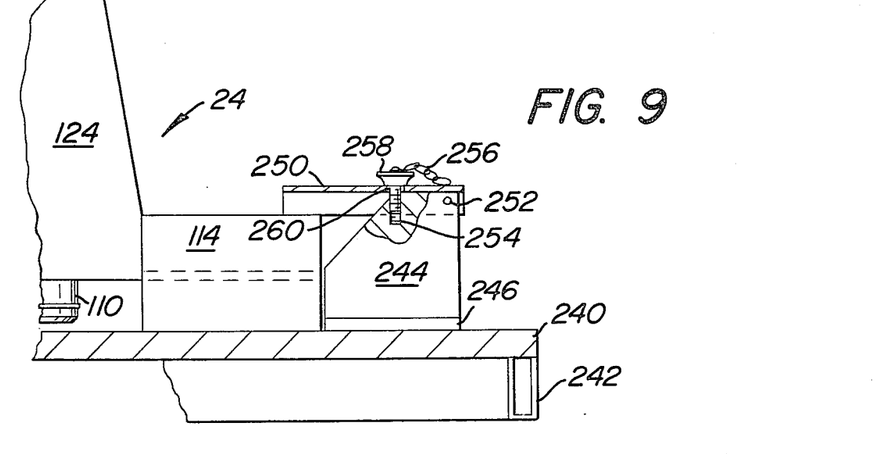
FIG. 9 is a sectional view taken along the line 9—9 of FIG. 5, with the parts in their assembled condition.

When the pallet 238 is to be used for receiving a cage assembly 24 (FIG. 16), the U-shaped bars 250 are all pivoted to a vertical position, such as that shown in FIG. 5. As The cage assembly 24 is lowered, the legs 114 are aligned with plates 254. The continued lowering of the cage assembly will bring the legs into abutment with the beveled edges 248 of plates 254, thereby centering the cage assembly during its downward movement. When the cage assembly has been fully lowered, the legs 114 will be adjacent the plates 244 and will be resting on plate 240 (FIG. 9). Thereafter, the bars 250 are rotated to a horizontal position around pins 252 (FIG. 9).

With the bars 250 in the horizontal position, the plates 244 are received between the legs of the U-shaped bars. Bolts 254 are then inserted through openings 260 in bars 250 (FIG. 5), and threadedly secured in plates 244. The bolts are rotated in place by rotating thumb wheels 258.

It is thus seen that the lowered bars 250 securely hold the cage assembly 24 on pallet 238. The pallet is then easily moved by inserting the forks on a fork-lift truck under plate 240 and between legs 242, in a conventional manner. The pallet can be moved to another room or can be transported to another location for refitting the same with unused filter cartridges 146. Thereafter, the pallet and cage assembly can be returned to the area of the filter system so that a new cage assembly having clean filter cartridges thereon can be dropped in place whenever a cage assembly having contaminated cartridges is removed. The entire operation of removing a cage assembly, dumping the contaminated cartridges, placing the cage assembly on a pallet and replacing a cage assembly having clean cartridges in the filter tank can be accomplished in approximately one-half hour.

It is thus seen that the system of this invention provides an efficient and simple means for changing replaceable cartridges in a filter system. It provides a marked improvement over the prior art methods of replacing individual filter cartridges or of replacing filter tubes having the spent cartridges thereon. The insertion of the cage assembly is easily accomplished, and there are sufficient guides in the filter tank for accurately and quickly seating the cage assembly. There is no down time for replacing filter cartridges in view of the fact that the entire cage assembly can be changed at one time. The filter cartridges can be replaced at leisure. In fact, the changing of the filter cartridges is far simpler in view of the fact that the filter tubes are all exposed when the cage assembly is on the pallet.

One of the features of the filter tube of this invention is the provision of the reinforcing bar 140. The bar is positioned in the filter tube perpendicular to the axis of rotation of the cage assembly around the trunnions 128. Accordingly, the bars 142 are strengthening ribs to maintain the rigidity of the filter tubes 134 when the cartridges 146 are dumped (FIG. 15).

Without further elaboration, the foregoing will so fully illustrate my invention, that others may, by applying current or future knowledge, readily adapt the same for use under various conditions of service.

What is claimed as the invention is:

1. A filter system comprising a tank and filter cage assembly, said filter cage assembly being removably mounted in said tank, said filter cage assembly comprising a plurality of replaceable filters, said filter cage assembly having a chamber therein for receiving filtered fluid, said chamber having an outlet therefrom, said chamber comprising a tube sheet and a bottom plate, said tube sheet having a plurality of filter tubes projecting therethrough and into said chamber, said replaceable filters being mounted on said tubes and means on said filter cage assembly for removing said assembly from said tank.

2. The filter system of claim 1 wherein said tubes are secured in said bottom plate.

3. The filter system of claim 1 wherein each of said replaceable filters are cylindrical and have a central bore passing therethrough, with a plurality of replaceable filters being stacked on each of said filter tubes.

4. The filter system of claim 3 wherein said tank comprises a lower portion and an upper portion, cover means on each stack of filters, said cover means being fluid-impervious, and compression spring means bearing against each of said cover means to compress said replaceable filters together, said cover of said tank having means bearing against said spring means.

5. The filter system of claim 4 wherein said means bearing against said spring means comprises a plate having a plurality of openings therein, with said fluid to be filtered passing through said openings and into said tank adjacent said replaceable filters.

6. A filter system comprising a tank and filter cage assembly, said filter cage assembly being removably mounted in said tank, said tank including a channel for incoming fluid, said channel serving as a guide for placement of said cage assembly within said tank, said filter cage assembly comprising a plurality of replaceable filters, said filter cage assembly having a chamber therein for receiving filtered fluid, said chamber having an outlet therefrom, and means on said filter cage assembly for removing said assembly from said tank.

7. The filter system of claim 6 wherein said tank includes a second channel for removing filtered fluid therefrom, said second channel also serving as a guide means for placing said cage assembly within said tank.

8. A filter system comprising a tank and filter cage assembly, said filter cage assembly being removably mounted in said tank, said filter cage assembly comprising a plurality of replaceable filters, said tank having a channel for incoming fluid to be filtered, said channel projecting into said tank, said tank further having an exhaust channel for filtered fluid, said exhaust channel projecting into said tank, said cage assembly having notches therein, said notches being of the same shape as said channels, but being slightly larger in dimension than said channels, with said channels and notches cooperating to form guides in placing said cage assembly into said tank, said filter cage assembly having a chamber therein for receiving filtered fluid, said chamber having an outlet therefrom, and means on said filter cage assembly for removing said assembly from said tank.

9. A filter system comprising a tank and filter cage assembly, said filter cage assembly being removably mounted in said tank, said filter cage assembly comprising a plurality of replaceable filters, said filter cage assembly having a chamber therein for receiving filtered fluid, said chamber having an outlet therefrom, means on said filter cage assembly for removing said assembly from said tank and a lifting mechanism associated with said tank and cage, said lifting mechanism including means for releasably securing said lifting mechanism on said removing means of said filter cage, and a hoist associated with said lifting mechanism for lifting said cage from said tank.

10. The filter system of claim 9 wherein said lifting mechanism comprises two pairs of pivoted bars, with each pair of pivoted bars being adapted to be releasably secured to said filter cage.

11. The filter system of claim 10 wherein each of said bars has an arcuate spring on the outer surface thereof, said springs being adapted to contact said tank when said bars are inserted in said tank, and said bars having camming surfaces thereon to pivot said bars away from each other when inserted in said tank, against the pressure of said springs.

12. The filter system of claim 9 wherein said tank comprises a lower portion and an upper portion, said upper portion being releasably secured on said lower portion with a fluid-tight connection, said upper portion having means thereon for lifting said upper portion from said lower portion, and said lifting mechanism being adapted to be releasably secured to said upper portion for lifting said upper portion from said lower portion.

13. The filter system of claim 9 and further including loop means on said cage assembly, said loop means being adapted to be connected to cable means, whereby said cage assembly can be pivoted around said loop means by said lifting mechanism after said cage assembly has been removed from said tank.

14. A filter cage assembly comprising a tube sheet, a plate positioned below said tube sheet, wall means connecting said tube sheet and said plate, and forming a chamber between said tube sheet and said plate, a plurality of filter tubes passing through said tube sheet and being releasably secured in said plate, said filter tubes having a plurality of openings formed therein, with said openings being above and below said tube sheet, and replaceable filter cartridges on each of said filter tubes.

15. The filter cage assembly of claim 14 wherein each of said filter tubes has a reinforcing bar mounted therein.

16. The filter cage assembly of claim 14 wherein each of said filter tubes is threadedly secured in said plate.

17. The filter cage assembly of claim 14 wherein each of said replaceable filters is cylindrical and has a central bore passing therethrough, with said replaceable filters being stacked on each of said filter tubes.

18. The filter cage assembly of claim 17 wherein each of said replaceable filters is formed from fabric and has a filter medium therein.

19. The filter cage assembly of claim 18 wherein said filter medium comprises fuller's earth.

20. The filter cage assembly of claim 14 and further including loop means secured on said plate exteriorly of said chamber, said loop means being adapted for tilting said cage assembly when said cage assembly is suspended from lifting means.

21. The filter cage assembly of claim 14 and further including a nipple secured to the bottom of said plate, and said nipple being in fluid communication with said chamber.

22. The filter cage assembly of claim 14, and further including opposed notches formed in said tube sheet and said plate, said notches serving as guide means for placing said cage assembly in a filter tank.

23. The filter cage assembly of claim 14 wherein said walls comprise legs for said filter cage assembly, with said walls projecting below said plate, said walls being adapted to be placed adjacent upstanding plates on a pallet, whereby said plates serve to prevent lateral movement of said cage assembly on said pallet.

24. In combination, a pallet and a filter cage assembly releasably secured thereon, said pallet comprising a supporting plate, a plurality of spaced legs secured to the underside of said supporting plate, a plurality of spaced vertically extending plates secured to the upper surface of said supporting plate, said filter cage assembly comprising a plurality of legs, a plenum chamber for filtered fluid, and filter means above said plenum chamber, said filter means being in fluid communication with said plenum chamber, said legs of said filter cage assembly being positioned adjacent said vertical plates of said pallet, and releasable locking means securing said filter cage assembly on said pallet.

25. The combination of claim 24 wherein said releasable locking means comprise a bar pivotably secured to each vertical plate, said bar being adapted to be pivoted from a vertical position wherein said filter cage assembly can be lowered onto said supporting plate to a horizontal position wherein said bars overlie the plenum chamber of said filter cage assembly, and means for locking said locking means in said overlying position.

26. A lifting mechanism comprising a plate, two pairs of spaced bars pivotally secured to said plate, said bars being free to pivot relative to each other, camming surfaces at the bottom of each of said bars, said camming surfaces being adapted to rotate said bars away from each other when they come in contact with a rod, each bar having a leaf spring secured on an outer edge thereof, said leaf springs being arcuate and being convex relative to the outer edge of the bar, said leaf springs being on opposite edges of each pair of bars, said leaf springs being secured at one end to their associated bars, with the other end being slidable along their associate bars, and means for latching said bars together to prevent rotation of said bars relative to each other.

27. The lifting mechanism of claim 26 and further including hook means formed in each of said bars, said hook means being positioned adjacent the top of each of said camming surfaces.

28. The lifting mechanism of claim 27 and further including second camming surfaces associated with said hook means, said second camming surfaces being higher on said bars than said first camming surfaces, said second camming surfaces also being adapted to rotate said bars away from each other when said bars contact a rod at said second camming surfaces.

29. The lifting mechanism of claim 26 wherein each pair of bars are pivotable about a common axis.

30. The lifting mechanism of claim 26 wherein each leaf spring will be on the edge of the bar which is farthest from the other bar when said bars are pivoted away from each other by said camming surfaces.

31. The lifting mechanism of claim 26 wherein each of said bars has an opening formed therein, said openings being alignable when said bars are aligned, and said latching means having a shaft which is releasably secured in said aligned openings to prevent rotation of said bars relative to each other.

32. The latching mechanism of claim 32 wherein said shaft is spring-urged into said openings.

33. The latching mechanism of claim 31 and further including means for releasably securing said shaft in two different positions, with one of said positions having said shaft in said aligned openings, and the other of said positions having said shaft removed from at least one of said aligned openings, whereby said bars are free to pivot relative to each other.

34. A filter cage assembly comprising a tube sheet, a plate positioned below said tube sheet, wall means connecting said tube sheet and said plate, and forming a chamber between said tube sheet and said plate, a plurality of filter tubes passing through said tube sheet and being releasably secured in said plate, said filter tubes having a plurality of openings formed therein, with said openings being above and below said tube sheet, each of said filter tubes having a tube of smaller diameter secured in the top thereof, said tube of smaller diameter being effective to remove a core of a replaceable filter when said replaceable filter is slid down said filter tubes, and replaceable filter cartridges on each of said filter tubes.

35. A filter cage assembly comprising a tube sheet, a plate positioned below said tube sheet, wall means connecting said tube sheet and said plate, and forming a chamber between said tube sheet and said plate, a plurality of filter tubes passing through said tube sheet and being releasably secured in said plate, said filter tubes having a plurality of openings formed therein, with said openings being above and below said tube sheet, replaceable filter cartridges on each of said filter tubes, and a pair of diametrically opposed, upstanding plates formed on said cage assembly, each of said plates having a trunnion secured thereon, said trunnions being adapted to provide pivots for lifting and rotating said cage assembly.

* * * * *